US009786395B2

(12) United States Patent
Singh et al.

(10) Patent No.: US 9,786,395 B2
(45) Date of Patent: Oct. 10, 2017

(54) AIR-COOLED HEAT EXCHANGER AND SYSTEM AND METHOD OF USING THE SAME TO REMOVE WASTE THERMAL ENERGY FROM RADIOACTIVE MATERIALS

(75) Inventors: Krishna P. Singh, Hobe Sound, FL (US); Joseph Rajkumar, Marlton, NJ (US)

(73) Assignee: HOLTEC INTERNATIONAL, INC.

( * ) Notice: Subject to any disclaimer, the term of this patent is extended or adjusted under 35 U.S.C. 154(b) by 837 days.

(21) Appl. No.: 14/113,990

(22) PCT Filed: Apr. 25, 2012

(86) PCT No.: PCT/US2012/035051
§ 371 (c)(1),
(2), (4) Date: Jan. 6, 2014

(87) PCT Pub. No.: WO2012/149057
PCT Pub. Date: Nov. 1, 2012

(65) Prior Publication Data
US 2014/0150994 A1    Jun. 5, 2014

Related U.S. Application Data

(60) Provisional application No. 61/478,788, filed on Apr. 25, 2011.

(51) Int. Cl.
*G21C 15/22* (2006.01)
*G21C 15/18* (2006.01)
*G21D 3/04* (2006.01)

(52) U.S. Cl.
CPC ............ *G21C 15/22* (2013.01); *G21C 15/18* (2013.01); *G21D 3/04* (2013.01); *Y02E 30/40* (2013.01)

(58) Field of Classification Search
CPC ....... G21C 15/18; G21C 15/22; F28D 21/001; F28D 7/16
(Continued)

(56) References Cited

U.S. PATENT DOCUMENTS 1,935,412 A * 11/1933 Joseph Price ............. F28D 7/16
165/158
2,185,928 A * 1/1940 Crowley, Jr. .............. B01J 8/06
165/158
(Continued)

FOREIGN PATENT DOCUMENTS

DE    2913520    10/1980
EP    0476563    3/1992
(Continued)

*Primary Examiner* — Etsub Berhanu
*Assistant Examiner* — Nelson Nieves
(74) *Attorney, Agent, or Firm* — The Belles Group, P.C.

(57) ABSTRACT

A system for removing thermal energy generated by radioactive materials is provided. The system comprises an air-cooled shell-and-tube heat exchanger, comprising a shell and plurality of heat exchange tubes arranged in a substantially vertical orientation within the shell, the heat exchange tubes comprising interior cavities that collectively form a tube-side fluid path, the shell forming a shell-side fluid path that extends from an air inlet of the shell to an air outlet of the shell, the air inlet at a lower elevation than the air outlet; a heat rejection closed-loop fluid circuit comprising the tube-side fluid path, a coolant fluid flowing through the heat rejection closed-loop fluid circuit, the heat rejection closed-loop fluid circuit thermally coupled to the radioactive materials; and the air-cooled shell-and-tube heat exchanger transferring thermal energy from the coolant fluid flowing through the tube-side fluid path to air flowing through the shell-side fluid path.

19 Claims, 4 Drawing Sheets

(58) Field of Classification Search
USPC ............ 165/47, 104.13; 376/403, 404
See application file for complete search history.

(56) References Cited

U.S. PATENT DOCUMENTS

| | | | |
|---|---|---|---|
| 2,185,930 A * | 1/1940 | Crowiey, Jr. | B01J 8/025 |
| | | | 165/183 |
| 3,183,967 A * | 5/1965 | Dindial | F28D 7/16 |
| | | | 165/83 |
| 3,247,069 A * | 4/1966 | Powell | G21D 3/14 |
| | | | 376/210 |
| 3,341,424 A | 9/1967 | Schlicht et al. | |
| 3,776,302 A | 12/1973 | Waszink et al. | |
| 3,984,282 A | 10/1976 | Kleimola | |
| 4,257,480 A * | 3/1981 | Winkleblack | F28D 7/106 |
| | | | 165/165 |
| 4,293,385 A * | 10/1981 | Brachet | G21D 1/04 |
| | | | 376/283 |
| 4,362,694 A * | 12/1982 | Kayser | G21C 1/03 |
| | | | 376/298 |
| 4,473,528 A | 9/1984 | Kleimola | |
| 4,478,784 A | 10/1984 | Burelbach | |
| 4,576,783 A * | 3/1986 | Koutz | G21D 9/00 |
| | | | 376/323 |
| 4,600,554 A * | 7/1986 | Brachet | F22B 1/063 |
| | | | 122/32 |
| 4,645,633 A * | 2/1987 | Hattori | F22B 1/063 |
| | | | 376/179 |
| 4,668,467 A | 5/1987 | Miler et al. | |
| 4,678,626 A | 7/1987 | Germer | |
| 4,687,626 A | 8/1987 | Tong | |
| 4,753,771 A | 6/1988 | Conway et al. | |
| 4,765,946 A | 8/1988 | Dagard et al. | |
| 4,818,475 A | 4/1989 | Gluntz et al. | |
| 4,998,509 A | 3/1991 | Gou et al. | |
| 5,076,999 A | 12/1991 | Forsberg | |
| 5,612,982 A | 3/1997 | Woodcock et al. | |
| 5,640,434 A * | 6/1997 | Rottenberg | G21C 1/10 |
| | | | 376/285 |
| 5,661,770 A | 8/1997 | Spinks | |
| 5,694,442 A | 12/1997 | Cinotti et al. | |
| 5,761,262 A | 6/1998 | No et al. | |
| 5,887,043 A | 3/1999 | Spinks | |
| 6,069,930 A | 5/2000 | Gamble et al. | |
| 6,243,432 B1 | 6/2001 | Cheung et al. | |
| 6,618,461 B2 | 9/2003 | Cheung et al. | |
| 6,795,518 B1 | 9/2004 | Conway et al. | |
| 6,839,396 B2 | 1/2005 | Willschuetz | |
| 6,865,244 B2 | 3/2005 | Meseth | |
| 7,245,688 B2 | 7/2007 | Nicholls et al. | |
| 8,081,729 B2 * | 12/2011 | Cros | F28D 9/0006 |
| | | | 165/157 |
| 2002/0101951 A1 | 8/2002 | Nakamaru et al. | |
| 2004/0196948 A1 | 10/2004 | Conway et al. | |
| 2005/0120715 A1 | 6/2005 | Labrador | |
| 2005/0135544 A1 | 6/2005 | Eoh et al. | |
| 2006/0054314 A1 * | 3/2006 | Mauvezin | B01J 8/008 |
| | | | 165/216 |
| 2007/0092053 A1 | 4/2007 | Sato | |
| 2007/0204623 A1 | 9/2007 | Rollins, III | |
| 2007/0253520 A1 | 11/2007 | Sim et al. | |
| 2008/0028769 A1 * | 2/2008 | Goenka | B60H 1/00328 |
| | | | 62/3.7 |
| 2008/0219397 A1 | 9/2008 | Sim et al. | |
| 2008/0310576 A1 | 12/2008 | Brisson et al. | |
| 2009/0067565 A1 | 3/2009 | Eckardt et al. | |
| 2009/0077971 A1 | 3/2009 | Schu | |
| 2009/0120091 A1 | 5/2009 | DuBois | |
| 2009/0129530 A1 | 5/2009 | Reyes, Jr. et al. | |
| 2009/0180939 A1 | 7/2009 | Hagen et al. | |
| 2009/0252277 A1 * | 10/2009 | Kim | G21C 1/00 |
| | | | 376/385 |
| 2009/0323884 A1 | 12/2009 | Sato et al. | |
| 2011/0158371 A1 | 6/2011 | Sato et al. | |
| 2011/0259574 A1 * | 10/2011 | Angel | F23L 15/04 |
| | | | 165/287 |

FOREIGN PATENT DOCUMENTS

| | | |
|---|---|---|
| GB | 527194 | 10/1940 |
| JP | 01223392 A * | 9/1989 |
| KR | 20090021722 | 3/2009 |
| KR | 20090102079 | 9/2009 |
| UA | 81419 | 1/2008 |

* cited by examiner

AIR-COOLED HEAT EXCHANGER AND SYSTEM AND METHOD OF USING THE SAME TO REMOVE WASTE THERMAL ENERGY FROM RADIOACTIVE MATERIALS

CROSS-REFERENCE TO RELATED PATENT APPLICATIONS

This application claims the benefit of U.S. Provisional Patent Application No. 61/478,788, filed Apr. 25, 2011, the entirety of which is incorporated herein by reference.

FIELD OF THE INVENTION

The present invention relates generally to air-cooled heat exchangers and systems and methods of using the same to remove thermal energy from radioactive materials, and specifically to air-cooled heat exchangers and systems and methods of using the same to remove waste thermal energy from radioactive materials, such as waste thermal energy of spent nuclear fuel.

BACKGROUND OF THE INVENTION

The reactor vessel and the spent fuel pool in nuclear power plants are principal locations of heat generation during the plant's operation or subsequent to a scram. In lightwater reactor installations, the heat produced in a reactor even after shutdown can be as much as 8% of the reactor's thermal power at the beginning of the scram decaying exponentially to less than 1% of the operating thermal power in a day's time. The heat energy produced by the irradiated nuclear fuel is deposited in the body of water surrounding the fuel in both the reactor and the fuel pool. Nuclear power plants are equipped with multiple systems to transfer the energy from the heated water mass (which is typically contaminated by traces of radionuclides) to a clean water loop (sometimes referred to as the component cooling water) using a shell-and-tube heat exchanger. The heat collected by the "component cooling water" is in turn rejected to the plant's natural heat sink such as a lake, a river, or an ocean through another tubular heat exchanger. The use of a closed loop component cooling water system to deliver the non-beneficial heat generated inside the nuclear plant (i.e., heat that cannot be harnessed as productive energy) to the aqueous environment has been the universal means of removing heat from the (potentially contaminated) fuel-exposed water in a nuclear plant. However, the recent devastating tsunami in the wake of the massive earthquake in the Pacific Ocean that struck Fukushima Daiichi plants in Japan showed the vulnerability in the state-of-the-art nuclear plant design practice. The Fukushima catastrophe suggests that the means for removing the plant's decay heat should be diversified to include direct rejection to air to further harden nuclear plants against beyond-the-design basis extreme environmental phenomena.

BRIEF SUMMARY OF THE INVENTION

These, and other drawbacks, are remedied by the present invention, which provides an independent system for rejecting waste heat generated by radioactive materials within a nuclear power plant to the ambient air.

In one embodiment, the invention can be a system for removing thermal energy generated by radioactive materials comprising: an air-cooled heat exchanger; a heat rejection closed-loop fluid circuit comprising a tube-side fluid path of the air-cooled heat exchanger, a coolant fluid flowing through the heat rejection closed-loop fluid circuit, the heat rejection closed-loop fluid circuit thermally coupled to the radioactive materials so that thermal energy generated by the radioactive materials is transferred to the coolant fluid; and the air-cooled heat exchanger comprising a shell-side fluid path having a first air inlet, a second air inlet and an air outlet, the first air inlet located at a first elevation, the second air inlet located at a second elevation, and the air outlet located at a third elevation, the second elevation greater than the first elevation and the third elevation greater than the second elevation, the air-cooled heat exchanger transferring thermal energy from the coolant fluid flowing through the tube-side fluid path to air flowing through the shell-side fluid path.

In another embodiment, the invention can be a system for removing thermal energy generated by radioactive materials comprising: an air-cooled shell-and-tube heat exchanger comprising a shell and plurality of heat exchange tubes arranged in a substantially vertical orientation within the shell, the plurality of heat exchange tubes comprising interior cavities that collectively form a tube-side fluid path, the shell forming a shell-side fluid path that extends from an air inlet of the shell to an air outlet of the shell, the first air inlet located at a lower elevation than the air outlet; a heat rejection closed-loop fluid circuit comprising the tube-side fluid path of the air-cooled heat exchanger, a coolant fluid flowing through the heat rejection closed-loop fluid circuit, the heat rejection closed-loop fluid circuit thermally coupled to the radioactive materials so that thermal energy generated by the radioactive materials is transferred to the coolant fluid; and the air-cooled shell-and-tube heat exchanger transferring thermal energy from the coolant fluid flowing, through the tube-side fluid path to air flowing through the shell-side fluid path.

In yet another embodiment, the invention can be a tube-and-shell air-cooled heat exchanger apparatus comprising: a shell having a shell cavity, a primary air inlet at a first elevation, a secondary air inlet at a second elevation, and an air outlet at a third elevation, wherein the second elevation is greater than the first elevation and the third elevation is greater than the second elevation, each of the primary air inlet, the secondary air inlet, and the air outlet forming a passageway through the shell to a shell-side fluid path; and a plurality of heat exchange tubes that collectively form a tube bundle having a substantially vertical longitudinal axis, the tube bundle located within the shell cavity, a tube-side fluid path comprising interior cavities of the plurality of heat exchange tubes.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE DRAWINGS

The following description of the preferred embodiment(s) is merely exemplary in nature and is in no way intended to limit the invention, its application, or uses. While the invention is exemplified in FIGS. 1-4 as being used to cool spent nuclear fuel that is located within a spent nuclear fuel pool, the invention is not so limited. In other embodiments, the invention can be used to reject waste thermal energy generated by radioactive materials to the ambient air irrespective of the type of radioactive materials being cooled and the type of body of liquid in which the radioactive materials are (or previously were) immersed. In certain embodiments, the pool of liquid can be a reactor pool. In other embodiments, the radioactive materials may be waste, including spent nuclear fuel, high level radioactive waste or low level radioactive waste, and/or non-waste.

Figure 1:
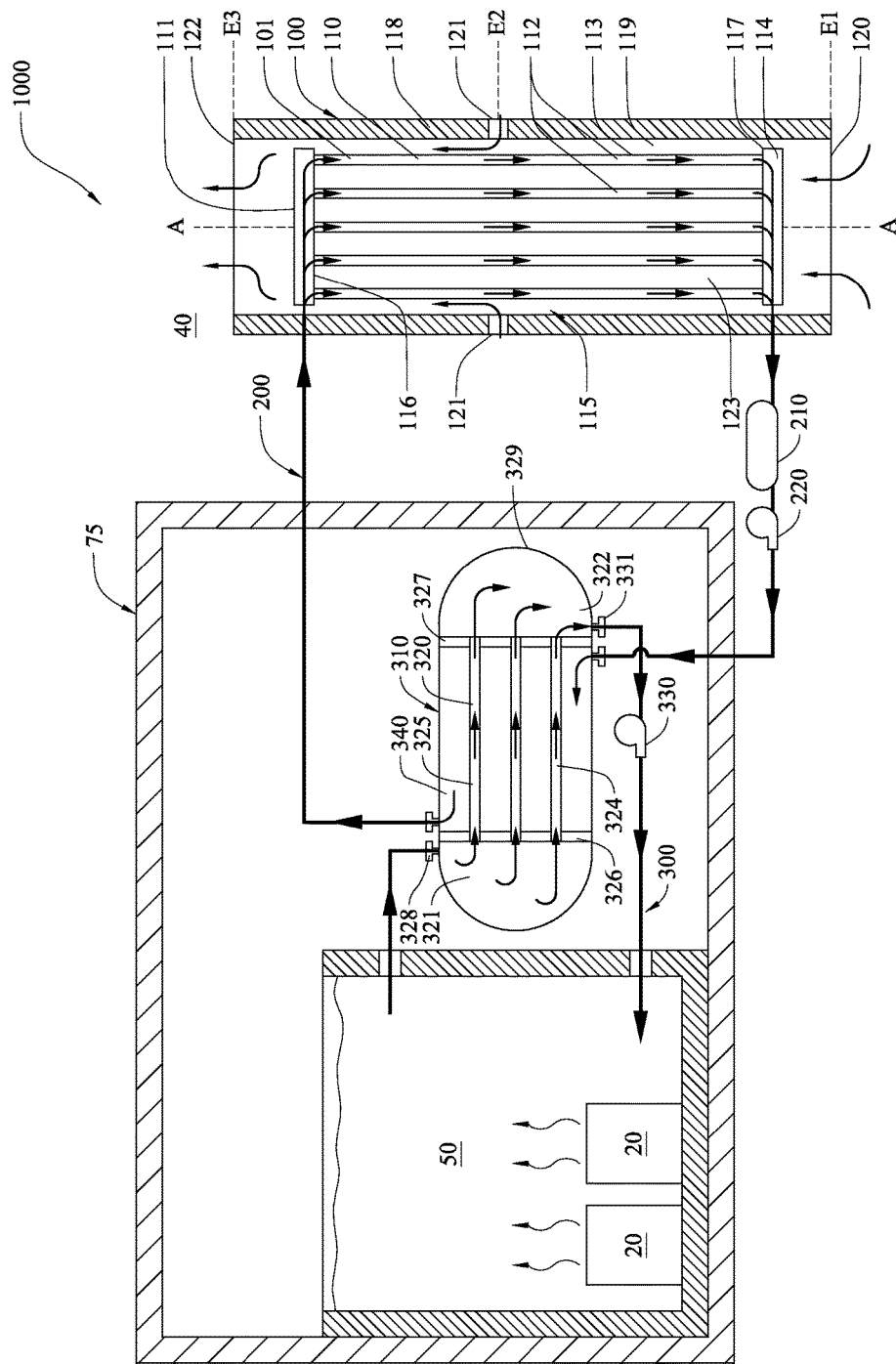
FIG. 1 is a schematic of a system for rejecting thermal energy generated by radioactive waste to the ambient air according to an embodiment of the present invention.

Referring first to FIG. 1, a cooling system 1000 for rejecting thermal energy generated by radioactive waste 20 to the ambient air 40 according to an embodiment of the present invention is schematically illustrated. The cooling system 1000 generally comprises an air-cooled heat exchanger 100 and a heat rejection closed-loop fluid circuit 200 that thermally couples the air-cooled heat exchanger 100 to the radioactive materials 20, which are immersed in a pool of a liquid 50. As a result of the thermal coupling, thermal energy generated by the radioactive waste 20 is transferred to the air-cooled heat exchanger 100 (and subsequently to the ambient air 40). Thermal coupling of the air-cooled heat exchanger 100 to the radioactive waste 20 via the heat rejection closed-loop fluid circuit 200 can either be direct thermal coupling or indirect thermal coupling. In the exemplified embodiment, the thermal coupling of the air-cooled heat exchanger 100 to the radioactive waste 20 via the heat rejection closed-loop fluid circuit 200 is accomplished via an indirect thermal coupling that includes an intermediate closed-loop fluid circuit 300. In this embodiment, the intermediate closed-loop fluid circuit 300 comprises the pool of liquid 50. In other embodiment, a pool of liquid 50 may not be required and the radioactive waste may transfer its thermal energy to a gaseous volume to which the air-cooled heat exchanger 100 is thermally coupled.

It should be noted that in certain alternate embodiments of the invention, more than one intermediate closed-loop fluid circuit 300 can be included in the cooling system 1000 that consecutively transfer thermal energy from the radioactive materials 20 to the heat rejection closed-loop fluid circuit 200. In such an embodiment, only a first one of the intermediate closed-loop fluid circuits 300 will comprise the pool of the liquid 50. Moreover, in certain other alternate embodiments, the intermediate closed-loop fluid circuit 300 can be omitted. In such an embodiment, the heat rejection closed-loop fluid circuit 200 can include the pool of the liquid 50.

The cooling system 1000, in the exemplified embodiment, further comprises an intermediate heat exchanger 310 which, as discussed below, transfers thermal energy from the liquid 50 to a coolant fluid 101 that flows through the heat rejection closed-loop fluid circuit 200. In the exemplified embodiment, the intermediate heat exchanger 310 is a tube-and-shell heat exchanger. However, in other embodiments, the intermediate heat exchanger 310 can be a plate heat exchanger, a plate and shell heat exchanger, an adiabatic heat exchanger, a plate fin heat exchanger, and a pillow plate heat exchanger.

The system 1000 further comprises a containment structure 75, which can be in the form of a building or other enclosure. The containment structure 75 provides radiation containment as would be appreciated by those skilled in the art. In certain embodiment, the system 1000 is designed so that the liquid 50, which comes into direct contact with the radioactive waste 20, never exists the containment structure 75. Thus, if a leak were to occur in the intermediate closed-loop fluid circuits 300, the contaminated liquid 50 would not be discharged into the surrounding environment. Thus, in the exemplified embodiment, the intermediate heat exchanger 310 and the entirety of the intermediate closed-loop fluid circuits 300 is located within the containment structure 75. Whether or not containment of the liquid 50 within the containment structure is required will depend on whether or not the liquid is contaminated, the type of radioactive waste 20 being cooled, and applicable regulations.

As mentioned above, radioactive materials 20 are immersed in the pool of the liquid 50, which in the exemplified embodiment is a spent fuel pool. Radioactive materials 20, such as spent nuclear fuel, generate a substantial amount of heat for a considerable amount of time after completion of a useful cycle in a nuclear reactor. Thus, the radioactive materials 20 are immersed in the pool of the liquid 50 to cool the radioactive materials 20 to temperatures suitable for dry storage. In embodiments where the radioactive materials 20 are spent nuclear fuel rods, said spent nuclear fuel rods will be supported in the pool of the liquid 50 in fuel racks located at the bottom of the pool of liquid 50 and resting on the floor. Examples of suitable fuel racks are disclosed in United States Patent Application Publication No. 2008/0260088, entitled Apparatus and Method for Supporting Fuel Assemblies in an Underwater Environment Having Lateral Access Loading, published on Oct. 23, 2008, and United States Patent Application Publication No. 2009/0175404, entitled Apparatus or Supporting Radioactive Fuel Assemblies and Methods of Manufacturing the Same, published on Jul. 9, 2009, the entireties of which are hereby incorporated by reference.

As a result of being immersed in the pool of the liquid 50, thermal energy from the radioactive materials 20 is transferred to the pool of the liquid 50, thereby heating the pool of liquid 50 and cooling the radioactive materials. However, as the pool of liquid 50 heats up over time, thermal energy must be removed from the pool of the liquid 50 to maintain the temperature of the pool of the liquid 50 within an acceptable range so that adequate cooling of the radioactive materials 20 can be continued.

The intermediate closed-loop fluid circuit 300 comprises, in operable fluid coupling, the pool of the liquid 50, a tube-side fluid path 320 of the intermediate heat exchanger 310, and a hydraulic pump 330. The aforementioned components/paths of the intermediate closed-loop fluid circuit 300 are operably and fluidly coupled together using appropriate piping, joints and fittings as is well-known in the art to form a fluid-tight closed-loop through which the liquid 50 can flow. The hydraulic pump 330 flows the liquid 50 through the intermediate closed-loop fluid circuit 300 as is known in the art. Of course, valves are provided as necessary and/or desirable along the intermediate closed-loop fluid circuit 300.

In the exemplified embodiment, the tube-side fluid path 320 of the intermediate heat exchanger 310 comprises a tube-side inlet header 321, a tube-side outlet header 322 and interior cavities 324 of the heat exchange tubes 325 of the intermediate heat exchanger 310. The shell 329 of the intermediate heat exchanger 310 comprises a tube-side inlet 328 for introducing heated liquid 50 into the tube-side fluid path 320 of the intermediate heat exchanger 310 and a tube-side outlet 331 for allowing cooled liquid 50 to exit the tube-side fluid path 320 of the intermediate heat exchanger 310.

Interior cavities 324 of the heat exchange tubes 325 fluidly couple the tube-side inlet header 321 and the tube-side outlet header 322, thereby forming the tube-side fluid path 320 of the intermediate heat exchanger 310. The heat exchange tubes 325 of the intermediate heat exchanger 310 are connected to an inlet tube sheet 326 and an outlet tube sheet 327 at opposite ends.

The heat rejection closed-loop fluid circuit 200 comprises, in operable fluid coupling, a shell-side fluid path 340 of the intermediate heat exchanger 310, a tube-side fluid path 110 of the air-cooled heat exchanger 100, a fluid coolant reservoir 210 and a hydraulic pump 220. The aforementioned components/paths of the heat rejection closed-loop fluid circuit 200 are operably and fluidly coupled together using appropriate piping, joints and fittings as is well-known in the art to form a fluid-tight closed-loop through which the coolant fluid 101 can flow. The hydraulic pump 220 flows the coolant fluid 101 through the heat rejection closed-loop fluid circuit 200 as is known in the art. Of course, valves are provided as necessary and/or desirable along the heat rejection closed-loop fluid circuit 200. The coolant fluid 101 can take on a wide variety of fluids, including both liquids and gases. In one embodiment, the coolant fluid 101 is water in liquid phase.

The tube-side fluid path 110 of the air-cooled heat exchanger 100 comprises, in operable fluid coupling, a coolant fluid inlet header 111, interior cavities 112 of a plurality of heat exchange tubes 113, and a coolant fluid outlet header 114. The plurality of heat exchange tubes 113 collectively form a tube bundle 115 that extends along a substantially vertical longitudinal axis A-A. Furthermore, each of the heat exchange tubes 113 of the air-cooled heat exchanger 100 are arranged in a substantially vertical orientation. The tube bundle 115 further comprises a top tube sheet 116 and a bottom tube sheet 117. The heat exchange tubes 113 of the air-cooled heat exchanger 100 are connected to and extend between the top tube sheet 116 and the bottom tube sheet 117.

The air cooled heat exchanger 100 further comprises a shell 118 that forms a shell cavity 119. The tube bundle 115 is positioned within the shell cavity 119. The air cooled heat exchanger 100 further comprises a primary air inlet 120, a secondary air inlet 121 and an air outlet 122. Each of the primary air inlet 120, the secondary air inlet 121 and the air outlet 122 form passageway through the shell 118 from the shell cavity 119 to the ambient air 40. As such, ambient air 40 can flow into and/or out of the shell cavity 119 via the primary air inlet 120, the secondary air inlet 121 and the air outlet 122 so that thermal energy can be convectively removed from the exterior surfaces of the heat exchange tubes 113. More specifically, cool ambient air 40 flows into the shell cavity 119 via the primary air inlet 120 and the secondary air inlet 121 while warmed ambient air 40 flows out of the shell cavity 119 via the air outlet 122. As can be seen, the primary air inlet 120 is located a first elevation E1, the secondary air outlet 121 is located at a second elevation E2 and the air outlet 122 is located at a third elevation E3. The second elevation E2 is greater than the first elevation E1. The third elevation E3 is greater than the second elevation E2. In one embodiment, the primary air inlet 120 has a greater effective cross-sectional area than the secondary air outlet 121. The invention, however, is not so limited in all embodiments. While not illustrated in FIG. 1, the air-cooled heat exchanger 100 can comprise a blower (see FIG. 2) to induce air flow through the shell-side fluid path 123 of the shell cavity 119. Conceptually, the shell-side fluid path 123 of the air-cooled heat exchanger 100 is the remaining free volume of the shell cavity 119 through which the ambient air 40 can flow (after the tube bundle 115 and other components are positioned therein).

In other embodiments of the present invention, the air cooled heat exchanger 100 may comprise a plurality of secondary air inlets 121. In such instances, the plurality of secondary air inlets 121 may be at varying elevations between the first elevation E1 and the third elevation E3. Stated another way, in such embodiments the plurality of secondary air inlets 121 may be at a plurality of different elevations between the first elevation E1 of the primary air inlet 120 and the third elevation E3 of the air outlet 122. In further embodiments, the secondary air inlet 121 may be omitted.

In the exemplified embodiment, the air-cooled heat exchanger 100 is a vertical single tube pass counter-current heat exchanger. However, in certain embodiment, multiple pass heat exchangers can be used for either the air-cooled heat exchanger 100 and/or the intermediate heat exchanger 310. The heat exchange tubes 325 of the intermediate heat exchanger 310 and the heat exchange tubes 113 of the air-cooled heat exchanger 100 are made of made of a highly thermally conductive and corrosion resistant material. Suitable materials include aluminum, copper, and aluminum alloys.

During operation of the system, the hydraulic pumps 330 and 210 are activated. Activation of the hydraulic pump 330 flows liquid 50 through the intermediate closed-loop fluid circuit 300 while activation of the hydraulic pump 220 flows coolant fluid 101 through the heat rejection closed-loop fluid circuit 200. As discussed above, the thermal energy generated by the radioactive waste 20 is initially transferred to the liquid 50 while in the pool. This heated liquid 50 flows from the pool and into the tube-side fluid path 320 of the intermediate heat exchanger 310. Simultaneously, the coolant fluid 101 (which at this stage has been cooled by the air-cooled heat exchanger 100) flows through the shell-side fluid path 340 of the intermediate heat exchanger 310. As the heated liquid 50 flows through the tube-side fluid path 320 of the intermediate heat exchanger 310, thermal energy is transferred from the heated liquid 50 to the cool coolant fluid 101 that is flowing though the shell-side fluid path 340 of the intermediate heat exchanger 310. The cooled liquid 50 then exits tube-side path 320 of the intermediate heat exchanger 310 and is returned back to the pool for further cooling of the radioactive materials 20 where it is again heated up and the cycle continues.

The heated coolant fluid 101 (which has absorbed the thermal energy from the heated liquid 50) exits the shell-side path 340 of the intermediate heat exchanger 310 and flows into the top header 111 of the air-cooled heat exchanger 100 where it is then distributed to the interior cavities 112 of the plurality of heat exchange tubes 113. The heated coolant fluid 101 flows downward through the plurality of heat exchange tubes 113. As the heated coolant fluid 101 flows through the plurality of heat exchange tubes 113, thermal energy from the heated coolant fluid 101 is transferred to ambient air 40 that is flowing through the shell-side fluid path 123 of the air cooled-heat exchanger 100. The ambient air 40 enters the primary air inlet 120 as cool air. As thermal energy from the coolant fluid 101 is transferred to this cool ambient air 40 within the shell-side fluid path 123, the ambient air 40 becomes warmed and rises naturally within the shell-side fluid path 123 and exits the air-cooled heat exchanger 100 via the air outlet 122 as heated air. Additionally, as the warmed ambient air 40 rises within the shell-side fluid path 123, additional cool ambient air 40 is drawn into the shell-side fluid path 123 via the second air inlet 121. The second air inlet 121 also serves as a backup to the primary air inlet 120 in the event that the site is flooded and the primary inlet 120 becomes submerged in water.

Figure 2:
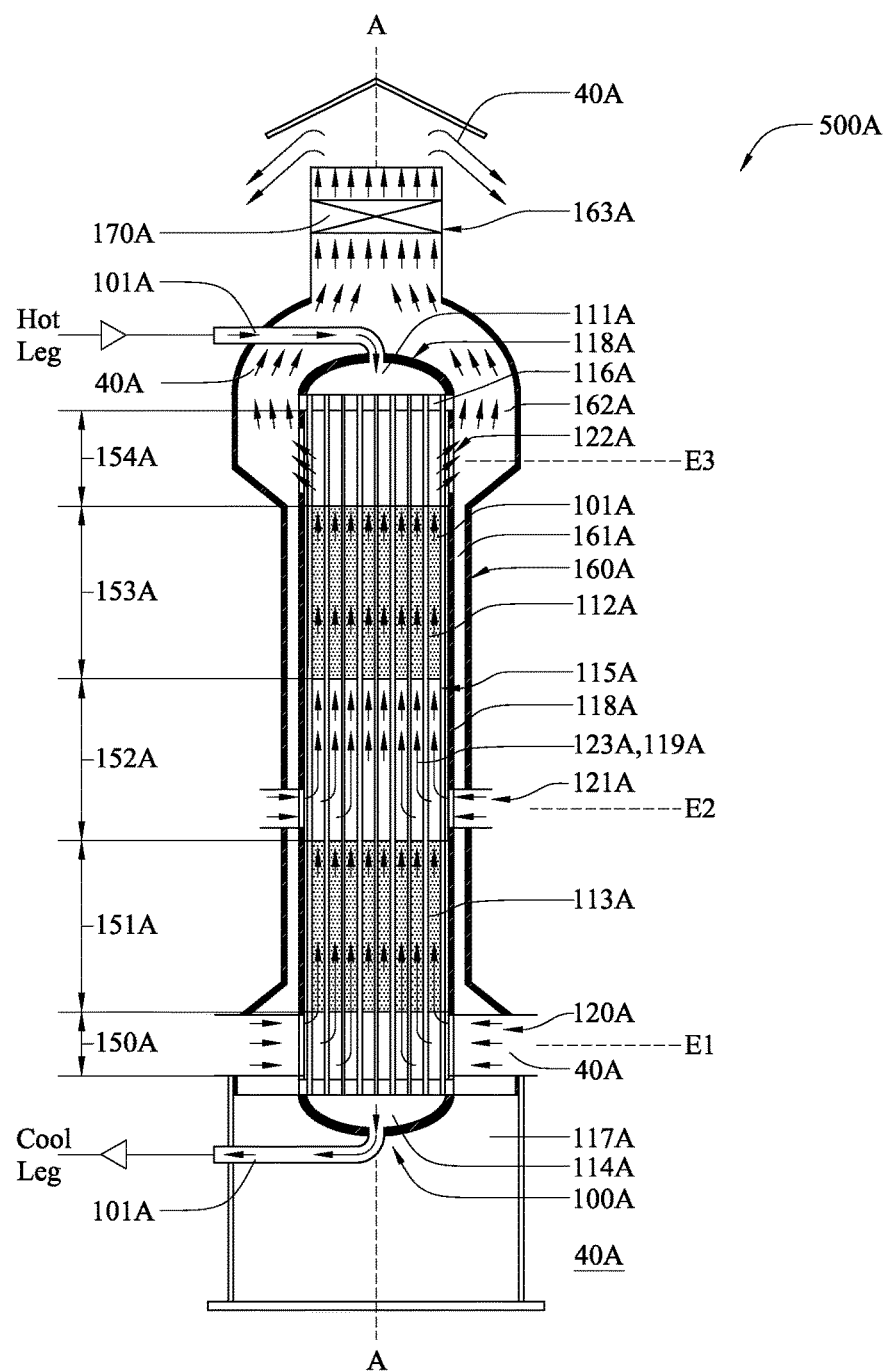
FIG. 2 is a schematic of a shell-and-tube air-cooled heat exchanger that can be used in the system of FIG. 1 according to an embodiment of the present invention.

Referring now to FIG. 2, a tube-and-shell air-cooled heat exchanger apparatus 500A that is particularly useful as the air-cooled heat exchanger 100 for the cooling system 1000 is illustrated. The tube-and-shell air-cooled heat exchanger apparatus 500A will be described with the understanding that those parts of the tube-and-shell air-cooled heat exchanger apparatus 500A that correspond to the air-cooled hate exchanger 100 will be given like reference numbers with the addition of an "A" suffix.

The tube-and-shell air-cooled heat exchanger apparatus 500A generally comprises a tube-and-shell air-cooled heat exchanger 100A and a shroud 160A. The tube-and-shell air-cooled heat exchanger 100A comprises a tube bundle 115A and a shell 118A. The shroud 160A comprises a shroud cavity 161A. The shell 118A comprises a shell cavity 119A. The tube bundle 115A is positioned within the shell cavity 119A and supported therein a substantially vertical orientation along substantially vertical axis A-A. The tube-and-shell air-cooled heat exchanger 100A is positioned within the shroud cavity 161A and supported therein in a substantially vertical orientation along vertical axis A-A. In certain embodiments, the shroud 160A may be omitted. In certain other embodiments, the shroud 160A may be considered the shell of the tube-and-shell air-cooled heat exchanger apparatus 500A while the shell 118A is omitted.

The tube-and-shell air-cooled heat exchanger apparatus 500A comprises a shell-side fluid path 123A and a tube-side fluid path 110A. As mentioned above, the shell-side fluid path 123A can be conceptualized as the free volume of the shell cavity 119 that remains after the tube bundle 115A (and other components) is positioned therein. The tube-side fluid path 110A comprises the interior cavities 112A of the plurality of heat exchange tubes 113A along with the coolant fluid inlet header 111A and the coolant fluid outlet header 114A. The coolant 101 flows through the tube-side fluid path 110A while the ambient air flows through the shell-side fluid path 123A as discussed above for FIG. 1 to effectuate transfer of thermal energy from the coolant fluid 101 to the ambient air 40.

The tube-and-shell air-cooled heat exchanger apparatus 500A comprises a primary air inlet 120A, a secondary air inlet 121A, and an air outlet 122A. The primary air inlet 120A and the secondary air inlet 122A form passageways from the ambient air 40 outside of the shroud 160A into the shell-side fluid path 123A, thereby allowing cool air to enter the shell-side fluid path 123A from outside of the shroud 160A. The air outlet 122A forms a passageway from the shell-side fluid path 123A to a shroud outlet plenum 162A that circumferentially surrounds a top portion of the shell 118A. A chimney 163A is provided on the shroud 160A that forms a passageway from the shroud outlet plenum 162A to the ambient air 40A outside of the shroud 160A. Thus, warmed ambient air 40A exits the shell-side fluid path 123A via the air outlet 122A, the warmed ambient air 40A will flow into the shroud outlet plenum 162A, rise therein, and exit the shroud via the passageway of the chimney 163A. In order to induce greater flow of ambient air through the shell-side fluid path 123A of the tube-and-shell air-cooled heat exchanger apparatus 500A, a blower 170A is provided in the chimney 163A. In other embodiments, the blower 170A may be positioned at other suitable locations.

Each of the primary air inlet 120A, the secondary air inlet 121A, and the air outlet 122A extend through the shell 118A and are substantially horizontal. The primary air inlet 120A is formed by one or more conduits that extend through the shroud 160A and to the shell 118A so that all of the incoming cool air flows into the shell-side fluid path 123A and not into the shroud cavity 161A. Similarly, the secondary air inlet 121A is formed by one or more conduits that extend through the shroud 160A and to the shell 118A so that all of the incoming cool air flows into the shell-side fluid path 123A and not into the shroud cavity 161A.

The primary air inlet 120A is located a first elevation E1, the secondary air outlet 121A is located at a second elevation E2 and the air outlet 122A is located at a third elevation E3. The second elevation E2 is greater than the first elevation E1. The third elevation E3 is greater than the second elevation E2. In one embodiment, the primary air inlet 120A has a greater effective cross-sectional area than the secondary air outlet 121A.

The plurality of heat exchange tubes 113A are discontinuously finned tubes. In other words, each of the plurality of heat exchange tubes 113A comprise axial sections that include fins 180A (FIG. 3) and axial sections that are free of any fins. In certain alternate embodiments of the invention, a first subset of the heat exchange tubes 113A may be discontinuously finned tubes, a second subset of the heat exchange tubes 113A may be continuously finned along their length, and a third subset of the heat exchange tubes 113A may be free of fins along their entire length.

In the exemplified embodiment, the plurality of heat exchange tubes 113A collectively form the tube bundle 115A. Due their discontinuously finned nature, the tube bundle 115a comprises finned tube sections 151A, 153A and non-finned tube sections 150A, 152A, 154A. The finned tube sections 151A, 153A and the non-finned tube sections 150A, 152A, 154A are in axial alignment and arranged in an alternating manner. In the finned tube sections 151A, 153 A of the tube bundle 115A, each of the heat exchange tubes 113A comprise fins 180A that increase thermal energy transfer from the coolant fluid 101A to the ambient air 40A by increasing the outer surface area of the tubes 113A. In the non-finned tube sections 150A, 152A, 154A, the plurality of heat exchange tubes 113A are free of any fins.

As can be seen in FIG. 2, in the exemplified embodiment, the non-finned tube sections 150A, 152A, 154A are transversely aligned with the primary air inlet 120A, the secondary air inlet 121A, and the air outlet 122A respectively. By aligning each of the primary air inlet 120A, the secondary air inlet 121A, and the air outlet 122A with one of the non-finned tube sections 150A, 152A, 154A, ambient air 40A can enter and exit the tube bundle 115A more effectively. Stated simply, by omitting (or substantially reducing the number of) the fins in these sections 150A, 152A, 154A, the impedance effect that the fins have on the cross-flow of the ambient air is eliminated and/or minimized. Thus, air flow through the shell-side path 123A is increased. Furthermore, the creation and arrangement of the tinned tube sections 151A, 153A and the non-tinned tube sections 150A, 152A, 154A on the tube bundle 115A (as discussed above) can create a venturi effect at the secondary air inlet 121A (and potentially at the primary air inlet 120A).

Figure 4:
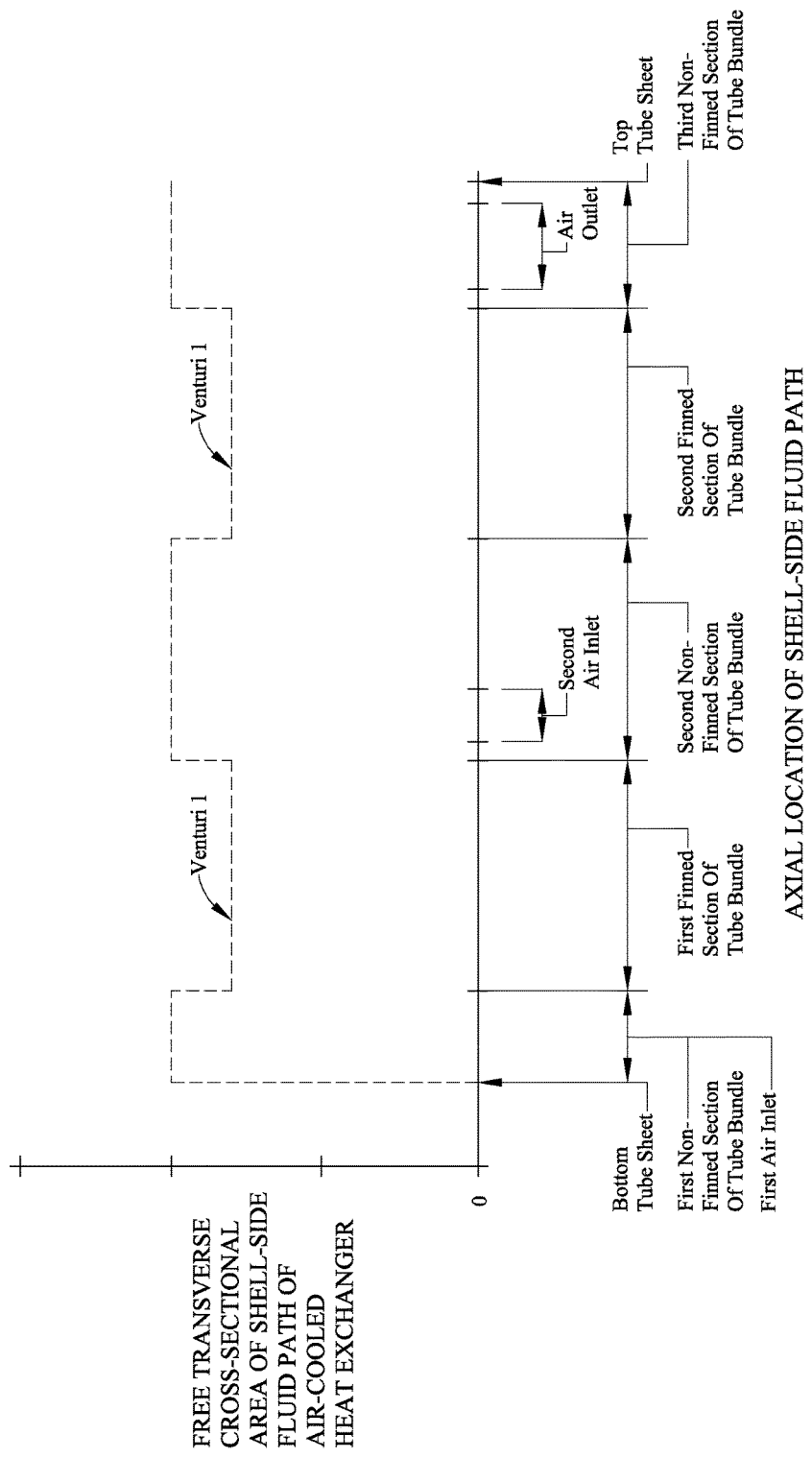
FIG. 4 is a graph of the free cross-sectional area of the shell-side fluid path of the shell-and-tube air-cooled heat exchanger of FIG. 2 along a length of the shell-side fluid path in according to an embodiment of the present invention.

Referring to FIGS. 2 and 4 concurrently, it can be seen that providing fins 180A on the finned tube sections 151A, 153A effectively reduces the free transverse cross-sectional area of the shell-side path 123A because the fins 180A occupy additional space of the shell cavity 119A. Thus, from the perspective of the shell-side fluid path 123A, the finned tube sections 151A, 153A create a reduced cross-sectional area, which can be considered a venturi restriction. As a result of the finned section 153A, which is located at an elevation between the secondary air inlet 121A and the air outlet 122A, a venturi is formed that assists in drawings additional cool ambient air 40A into the secondary air inlet 121A. Thus, in the exemplified embodiment, the venturi is created by the fins 180A of the plurality of heat exchange tubes 113A. Each of the fins 180A of the plurality of heat exchange tubes 113A comprise opposing surfaces that extent substantially parallel to the substantially vertical axis A-A.

The shell-side fluid path 123A comprises a first venturi located at an elevation between the primary air inlet 120A and the secondary air inlet 121A. Furthermore, the shell-side fluid path 123A comprises a second venturi located at an elevation between the secondary air inlet 121A and the air outlet 122A. As graphically illustrated in FIG. 4, the shell-side fluid path 123A comprises a first free transverse cross-sectional area at the second elevation (i.e. at the secondary air inlet 121A) and a second free transverse cross-sectional area at an elevation between the secondary air inlet 121A and the air outlet 122A, wherein the second free transverse cross-sectional area is less than the first free transverse cross-sectional area. Moreover, the shell-side fluid path 123A comprises a third free transverse cross-sectional area at the third elevation (i.e., at the air outlet 122A), wherein the third free transverse cross-sectional area is greater than the second free transverse cross-sectional area.

In embodiments of the invention where the focus is on existence of a venturi being created in the shell-side fluid path 123A, the venturi can be created in additional ways, such as for example reducing the transverse cross-section of the shell 119A or adding additional flow barriers. In certain other embodiments, a venturi can be created by simply adding more or thicker fins to the desired area of the tube bundle.

Figure 3:
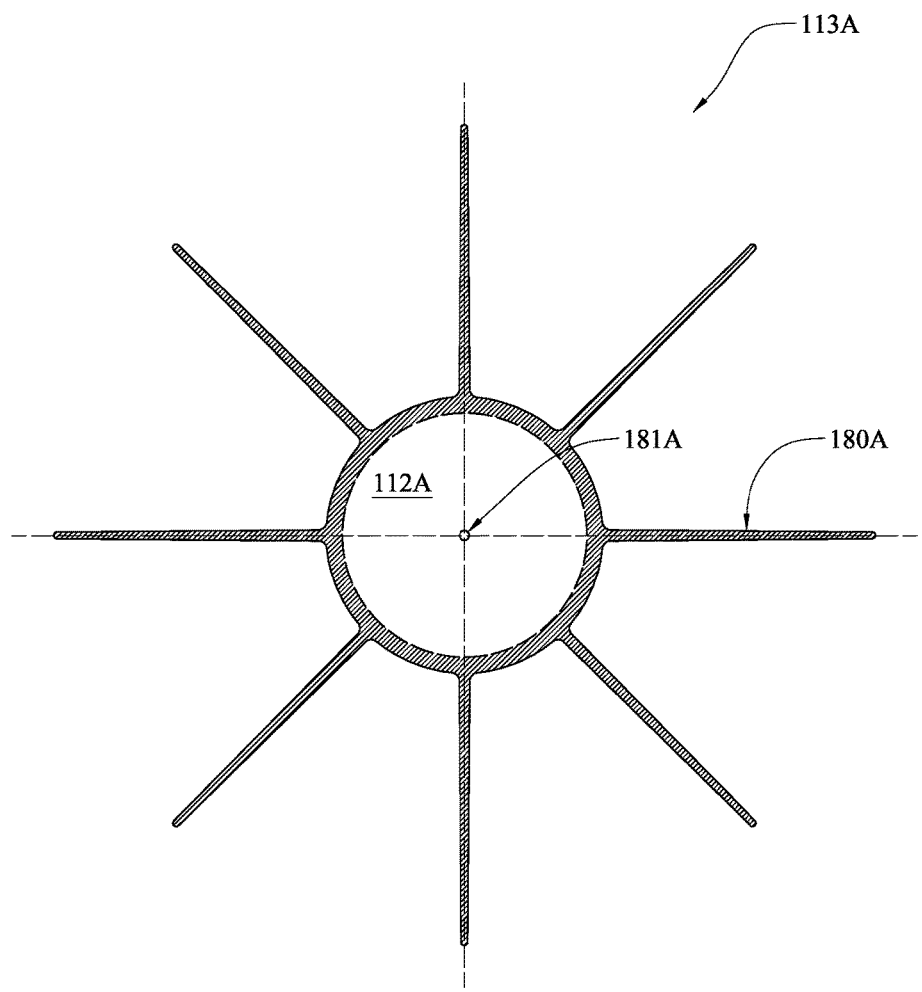
FIG. 3 is a transverse cross-section of a heat exchange tube of the shell-and-tube air-cooled heat exchanger along a finned section according to an embodiment of the present invention.

Referring now to FIG. 3, a transverse cross-section of one of the heat exchange tubes 113A taken along one of the finned tube sections 151A, 153 is exemplified. The heat exchange tubes 113A comprise a plurality of fins 180A extending from a tube body 181A. The fins 180A can be formed by extruding a set of axial spines that give the tube 113A a "star burst" cross section. The height of the find 180A is selected to accord with the layout pitch of the tube bundle 115A such that the fins 180A provide a complete cross sectional coverage in the tube bundle 115A so as to promote maximum contact between the turbinated air and the fin surfaces. A candidate shape of the star burst for the square layout pitch is shown in FIG. 3. Of course, any number of fin arrangements and patterns can be used in other embodiments of the invention.

The design of the tube-and-shell air-cooled heat exchanger apparatus 500A described above has several parameters for modification to maximize its heat rejection capability for a specific application. The available parameters include tube I.D., number of fins per tube and size/shape of each fin, tube layout pitch, height of the tube bundle, in-tube flow velocity (by using the appropriate size pump) and air flow velocity (by selecting the appropriately sized blower). By an adroit selection of the above design parameters, it is possible to achieve the overall heat transfer coefficient for the bundle in excess of 10 Btu/hr-sq ft-deg F. Scoping calculations show that a 12 ft diameter, 20 ft tall heat bundle can remove as much as 5858 kW from contaminated water @ 140 deg. F. Multiple units can be arrayed in parallel to increase the heat removal capacity to the desired level.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A system for removing thermal energy generated by radioactive materials comprising:
    an air-cooled heat exchanger;
    a heat rejection closed-loop fluid circuit comprising a tube-side fluid path of the air-cooled heat exchanger, a coolant fluid flowing through the heat rejection closed-loop fluid circuit, the heat rejection closed-loop fluid circuit thermally coupled to the radioactive materials so that thermal energy generated by the radioactive materials is transferred to the coolant fluid; and
    the air-cooled heat exchanger comprising a shell-side fluid path having a first air inlet, a second air inlet and an air outlet, the first air inlet located at a first elevation, the second air inlet located at a second elevation, and the air outlet located at a third elevation, the second elevation greater than the first elevation and the third elevation greater than the second elevation, the air-cooled heat exchanger transferring thermal energy from the coolant fluid flowing through the tube-side fluid path to air flowing through the shell-side fluid path;
    the tube-side fluid path comprising internal cavities of a plurality of heat exchange tubes, the plurality of heat exchange tubes located within the shell-side fluid path;
    wherein the shell-side fluid path comprises a first venturi located at an elevation between the second air inlet and the air outlet, the first venturi created by fins of the plurality of heat exchange tubes;
    wherein the shell-side fluid path comprises a second venturi located at an elevation between the first air inlet and the second air inlet, the second venturi created by fins of the plurality of heat exchange tubes;
    wherein the fins are discontinuous in structure such that the plurality of heat exchange tubes between the first venturi and second venturi at the second air inlet do not have fins.

2. The system of claim 1 wherein the plurality of heat exchange tubes form a tube bundle having a longitudinal axis, and wherein each of the fins of the plurality of heat exchange tubes comprise opposing surfaces that extend substantially parallel to the longitudinal axis.

3. The system of claim 1 wherein the shell-side fluid path comprises a first free transverse cross-sectional area at the second elevation and a second free transverse cross-sectional area at an elevation between the second air inlet and the air outlet, the second free transverse cross-sectional area being less than the first free transverse cross-sectional area.

4. The system of claim 3 wherein the shell-side fluid path comprises a third free transverse cross-sectional area at the third elevation, the third free transverse cross-sectional area being greater than the second free transverse cross-sectional area.

5. The system of claim 1 further comprising:
an intermediate heat exchanger;
an intermediate closed-loop fluid circuit comprising, in operable fluid coupling, a pool of a liquid and a first fluid path of the intermediate heat exchanger, the radioactive materials immersed in the pool of the liquid, the liquid flowing through the intermediate closed-loop fluid circuit; and
the heat rejection closed-loop fluid circuit further comprising a second fluid path of the intermediate heat exchanger, the intermediate heat exchanger transferring thermal energy from the liquid flowing through the first fluid path to the coolant fluid flowing through the second fluid path.

6. The system of claim 5 wherein the pool of the liquid and the intermediate heat exchanger are contained within a containment structure.

7. The system of claim 1, wherein the plurality of heat exchange tubes are arranged in a substantially vertical orientation.

8. The system of claim 7 wherein the plurality of heat exchange tubes collectively form a tube bundle that extends along a longitudinal axis, and the tube bundle comprising finned tube sections and a non-finned tube section arranged in axial alignment, the second air inlet transversely aligned with the non-finned tube section between the finned tube sections.

9. The system of claim 8 wherein the finned tube sections and the non-finned tube section alternate along the longitudinal axis.

10. The system of claim 8 further comprising a plurality of the non-finned tube sections, each of the first air inlet, the second air inlet and the air outlet transversely aligned with one of the non-finned tube sections.

11. The system of claim 8 further comprising:
the air-cooled heat exchanger comprising a top tube sheet and a bottom tube sheet, the plurality of heat exchange tubes extending from the top tube sheet to the bottom tube sheet, the first air inlet located adjacent the bottom tube sheet and the air outlet located adjacent the top tube sheet; and
the tube-side fluid path of the air-cooled heat exchanger comprising a coolant fluid inlet header and a coolant fluid outlet header, the internal cavities of the plurality of heat exchange tubes forming passageways between the coolant fluid inlet header and the coolant fluid outlet header.

12. The system of claim 1 wherein the air-cooled heat exchanger comprises a shell, each of the first air inlet, the second air inlet and the air outlet formed in the shell.

13. The system of claim 12 further comprising:
a shroud forming a shroud cavity, the air-cooled heat exchanger located within the shroud cavity, the shroud cavity comprising a shroud outlet plenum circumferentially surrounding the air-cooled heat exchanger, the air outlet of the shell located within the shroud outlet plenum; and
a chimney forming a passageway from the shroud outlet plenum to an ambient environment.

14. The system of claim 1 further comprising a blower for inducing air flow through the shell-side fluid path.

15. A system for removing thermal energy generated by radioactive materials comprising:
an air-cooled shell-and-tube heat exchanger comprising a shell and plurality of heat exchange tubes arranged in a substantially vertical orientation within the shell, the plurality of heat exchange tubes comprising interior cavities that collectively form a tube-side fluid path, the shell forming a shell-side fluid path that extends from an air inlet of the shell to an air outlet of the shell, the first air inlet located at a lower elevation than the air outlet and the plurality of heat exchange tubes located within the shell-side fluid path;
the shell comprising a second air inlet located at an elevation between the first air inlet and the air outlet;
a heat rejection closed-loop fluid circuit comprising the tube-side fluid path of the air-cooled heat exchanger, a coolant fluid flowing through the heat rejection closed-loop fluid circuit, the heat rejection closed-loop fluid circuit thermally coupled to the radioactive materials so that thermal energy generated by the radioactive materials is transferred to the coolant fluid; and
the air-cooled shell-and-tube heat exchanger transferring thermal energy from the coolant fluid flowing through the tube-side fluid path to air flowing through the shell-side fluid path;
wherein the shell-side fluid path comprises a first venturi located at an elevation between the second air inlet and the air outlet, the first venturi created by fins of the plurality of heat exchange tubes;
wherein the shell-side fluid path comprises a second venturi located at an elevation between the first air inlet and the second air inlet, the second venturi created by fins of the plurality of heat exchange tubes;
wherein the fins are discontinuous in structure such that the plurality of heat exchange tubes between the first venturi and second venturi at the second air inlet do not have fins.

16. The system of claim 15 further comprising a pool of a liquid, the radioactive materials immersed in the pool of the liquid, wherein thermal energy generated by the radioactive materials is transferred to the liquid of the pool prior to being transferred to the coolant fluid.

17. The system of claim 15 further comprising:
a shroud forming a shroud cavity, the shell of the shell-and-tube air-cooled heat exchanger located within the shroud cavity, the shroud cavity comprising a shroud outlet plenum circumferentially surrounding the shell-and-tube air-cooled heat exchanger, the air outlet of the shell located within the shroud outlet plenum; and
a chimney forming a passageway from the shroud outlet plenum to an ambient environment.

18. The system of claim 15 further comprising a blower for inducing air flow through the shell-side fluid path.

19. The system of claim 15 wherein the plurality of heat exchange tubes collectively form a tube bundle that extends along a longitudinal axis, and the tube bundle comprising finned tube sections and non-finned tube sections arranged in alternating axial alignment.

\* \* \* \* \*